US012214918B2

(12) United States Patent
Nielsen et al.

(10) Patent No.: US 12,214,918 B2
(45) Date of Patent: Feb. 4, 2025

(54) SYSTEM FOR ALIGNMENT OF BIG BAGS AND METHOD THEREFORE

(71) Applicant: PanPac Engineering A/S, Pandrup (DK)

(72) Inventors: Christian Torp Nielsen, Pandrup (DK); Lasse Pedersen, Pandrup (DK)

(73) Assignee: PANPAC ENGINEERING A/S, Pandrup (DK)

( * ) Notice: Subject to any disclaimer, the term of this patent is extended or adjusted under 35 U.S.C. 154(b) by 0 days.

(21) Appl. No.: 18/254,282

(22) PCT Filed: Dec. 7, 2021

(86) PCT No.: PCT/DK2021/050357
§ 371 (c)(1),
(2) Date: May 24, 2023

(87) PCT Pub. No.: WO2022/122103
PCT Pub. Date: Jun. 16, 2022

(65) Prior Publication Data
US 2024/0092515 A1 Mar. 21, 2024

(30) Foreign Application Priority Data
Dec. 8, 2020 (DK) .......................... PA 2020 70819

(51) Int. Cl.
*B65B 43/42* (2006.01)
*B65B 43/36* (2006.01)
*B65B 57/04* (2006.01)

(52) U.S. Cl.
CPC .............. *B65B 43/36* (2013.01); *B65B 57/04* (2013.01)

(58) Field of Classification Search
CPC ........... B65B 39/12; B65B 1/06; B65B 57/04; B65B 43/36
See application file for complete search history.

(56) References Cited

U.S. PATENT DOCUMENTS 5,787,945 A * 8/1998 Riemersma ............. B65B 43/54
141/114
6,112,504 A * 9/2000 McGregor .............. B65B 39/00
141/10
(Continued)

FOREIGN PATENT DOCUMENTS

CN 202337366 U 7/2012
CN 107082128 A 8/2017
(Continued)

OTHER PUBLICATIONS

International Search Report dated Feb. 28, 2022 (3 pages) from PCT Priority Agglication PCT/DK2021/050357 filed Dec. 7, 2021.
(Continued)

*Primary Examiner* — Andrew M Tecco
(74) *Attorney, Agent, or Firm* — Crowell & Moring LLP; John C. Freman

(57) ABSTRACT

A system for alignment of big bags prior to product filling. The system includes a first alignment arrangement configured to rotate an inflated big bag. The first alignment arrangement including a first drive configured to operate a first rotation part, a counter hold, and a displacement arrangement for displacing the first alignment arrangement and/or the counter hold relative to a big bag.
The system may include a sensor arrangement configured to detect a rotational orientation of the inflated big bag and adapted to provide a sensor output based thereon, and a controller configured to receive the sensor output and control the first drive to rotate the inflated big bag based on the sensor output.
A method of alignment of big bags prior to product filling, a computer program configured for executing acts of the method and a computer readable medium for storing the computer program.

10 Claims, 6 Drawing Sheets

(56) References Cited

U.S. PATENT DOCUMENTS

| | | | | |
|---|---|---|---|---|
| 6,742,321 | B2* | 6/2004 | Gates | B65B 43/465 |
| | | | | 53/373.6 |
| 2004/0060266 | A1* | 4/2004 | Gates | B65B 43/465 |
| | | | | 493/318 |
| 2014/0284380 | A1* | 9/2014 | Toedtli | B65B 35/58 |
| | | | | 235/462.14 |

FOREIGN PATENT DOCUMENTS

| | | |
|---|---|---|
| CN | 112027127 A | 12/2020 |
| FR | 3 049 268 A1 | 9/2017 |
| WO | WO 2017/191209 A1 | 11/2017 |

OTHER PUBLICATIONS

Written Opinion dated Feb. 28, 2022 (6 pages) from PCT Priority Application PCT/DK2021/050357 filed Dec. 7, 2021.
Office Action dated May 25, 2021 from Danish priority Application PA 2020 70819 (8 pages foreign text) filed Dec. 8, 2020.

* cited by examiner

SYSTEM FOR ALIGNMENT OF BIG BAGS AND METHOD THEREFORE

This application is a National Stage application of International Application No. PCT/DK2021/050357, filed Dec. 7, 2021, the entire contents of which are incorporated herein by reference.

This application claims priority under 35 U.S.C. § 119 (a) to Danish Patent Application No. PA 2020 70819, filed on Dec. 8, 2020, the entire contents of each of which are incorporated herein by reference.

BACKGROUND OF THE INVENTION

Field of Disclosure

The disclosure relates to a system for alignment of big bags prior to product filling. The system includes a first alignment arrangement configured to rotate an inflated big bag including a first drive configured to operate a first rotation part, a counter hold, and a displacement arrangement for displacing the first alignment arrangement and/or the counter hold relative to a big bag.

The first rotation part may be adapted to be brought into contact with a first side of an inflated big bag and the counter hold may be adapted to be brought into contact with a second side of the inflated big bag opposing the first side of the inflated big bag.

Furthermore, the system may include a sensor arrangement configured to detect a rotational orientation of the inflated big bag and adapted to provide a sensor output based thereon, and a controller configured to receive the sensor output and control the first drive to rotate the inflated big bag based on the sensor output by means of the first rotation part.

The disclosure furthermore relates to a method of alignment of big bags prior to product filling, a computer program configured for executing acts of the method and a computer readable medium for storing the computer program.

DESCRIPTION OF THE RELATED ART

Filling of big bags with a product, for example, free-flowing material is regularly done in the following manner: Placement and securing of the opening or neck of a big bag around a spout or a feed pipe. The filling of the big bags with the product are generally carried out while the bottom of the big bag is supported on a surface. Prior to filling the big bags with the product, it is common to inflate the big bags and manually align the inflated big bag with the support surface e.g. a pallet.

The alignment of the big bags is typically performed in relation to an in-line filling system and the manually handling are typically performed in narrow space conditions and in elevated positions and hence a toilsome working environment, There is therefore a need to automate the alignment of the big bags and preferably in a manner wherein the alignment is implementable in or with existing systems.

One objective of this disclosure is to overcome one or more of the before mentioned shortcomings of the prior art.

A further objective is to achieve a system for automated handling of big bags for alignment of these prior to product filling.

Yet another objective is to achieve a system and a method being implementable in or with existing systems for handling big bags for filling of the big bags with a product. In yet a further objective, the system and method are implementable in or with existing in-line systems for handling big bags for filling of the big bags with a product.

SUMMARY OF THE INVENTION

Disclosed herein is a system for alignment of big bags prior to product filling. The system includes a frame defining a working space configured for receiving a big bag. The big bag has a top with an opening, a bottom and sides extending from the top to the bottom.

The system may furthermore include a spout and holding means configured for holding the big bag at the opening of the big bag, such that the spout extends into the opening of the big bag.

The system may be adapted for filling gas into the big bag through the opening to inflate the big bag when suspended by the holding means.

The system may furthermore include a first alignment arrangement configured to rotate the inflated big bag and including a first drive configured to operate a first rotation part in the working space, a counter hold, and a displacement arrangement for displacing the first alignment arrangement and/or the counter hold in the working space to bring the first rotation part into contact with a first side of the inflated big bag and the counter hold into contact with a second side of the inflated big bag opposing the first side of the inflated big bag.

Furthermore, the system may include a sensor arrangement configured to detect a rotational orientation of the inflated big bag in the working space and adapted to provide a sensor output based thereon, and a controller configured to receive the sensor output and control the first drive to rotate the inflated big bag based on the sensor output by means of the first rotation part.

The displacement of the counter hold, the first alignment arrangement or both during use of the system may be performed before inflating the big bag, after inflating or during.

Alternatively, a system for alignment of suspended, inflated big bags is disclosed. The system includes a first alignment arrangement configured to rotate an inflated big bag, the first alignment arrangement including a first drive configured to operate a first rotation part, a counter hold, and a displacement arrangement for displacing the first alignment arrangement and/or the counter hold relative to a big bag.

The first rotation part may be adapted to be brought into contact with a first side of an inflated big bag and the counter hold may be adapted to be brought into contact with a second side of the inflated big bag opposing the first side of the inflated big bag.

Furthermore, the system may include a sensor arrangement configured to detect a rotational orientation of the inflated big bag and adapted to provide a sensor output based thereon, and a controller configured to receive the sensor output and control the first drive to rotate the inflated big bag based on the sensor output by means of the first rotation part.

The following effects and advantages may be achieved for both embodiments of the system. The description has taken starting point in a system defined in respect to a working space and an inflated big bag held by a spout and holding means. These may be provided as external units. Alternatively, the inflated big bag may be suspended by other means.

In one aspect, the frame may be considered a set of boundaries defining a working space. Alternatively, the frame may be a physical element which may be provided as external means or included in the system.

In one aspect, a big bag may be defined as bags configured for holding a volume in the range of 500 L to 3000 L and/or having a height when inflated from bottom to top in the range of 0.5 m to 2.5 m. A big bag may for example be configured for holding 1000 L, 1500 L 2000 L or 2500 L having any of the heights in the range e.g. 1 m, 1.5 m or 2 m.

The displacement arrangement may be operated to displace the first rotation part and/or the counter hold to a degree where a clamping force is applied on the first and second side of the big bag. By operating the first rotation part such that a force parallel to the plane of the first side of the big bag is applied thereto, a rotation of the big bag can be achieved. The first rotation part may apply the force be means of rotating or linear displacing the surface of the first rotation part in contact with the big bag. Due to the restricted weight of the inflated big bag, the rotation may be achieved by exploiting the friction force between the surface of the first rotation part and the big bags surface. The friction force may be enhanced by displacing the counter hold and/or the first alignment arrangement to a degree where the sides of the inflated big bag are forced towards the centre of the big bag.

The counter hold may act as a counter hold having a surface adapted to achieve a frictional force between the counter hold's surface and the second surface of the big bag, when in contact herewith.

The effect of rotating the big bag may be to achieve a rotational orientation of the big bag aligned with a pallet for further transportation in a filling system for big bags.

Big bags may come in a variety of shapes e.g. they may have a square or rectangular shaped cross section in the horizontal plane. The cross sectional area may be fitted to common pallets sizes for optimal handling and stacking during storage, transportation etc.

In particular, when handling big bags, it is considered important that the entire bottom of the big-bag is arranged on the pallet once it is filled with the product to be transported. If parts of a product-filled big bag e.g. a corner is not supported by the pallet during transportation and storage, that part of the big bag is subject to a large internal pressure from the product and may rupture especially, if it becomes trapped between the pallet and an external unit e.g. another pallet, fork lift, amongst others.

In one embodiment of the system, the counter hold may include a second alignment arrangement comprising a second rotation part and a second drive configured to operate the second rotation part in the working space. The controller may be configured to furthermore control the second drive to rotate the inflated big bag by means of the second rotation part.

One effect of using a first and a second rotation part may be to apply forces to both the first and the opposing second side of the big bag, such that the big bag may be rotated without performing a linear displacement in the horizontal plane which may arise using the counter hold, which may be considered a passive element in regard to the operation of rotating the big bag.

In one embodiment of the system, the controller may be configured to control the operation direction of the first rotation part and the operation direction of the second rotation part, so to control the rotational direction of the inflated big bag.

One effect of this embodiment may be to rotate the big bag in a clockwise direction and in a counter clockwise direction.

In one embodiment of the system, the controller may be configured to control the operation direction of the first rotation part and the operation direction of the second rotation part, so to displace the big bag in a horizontal direction.

It is to be understood that a displacement in the horizontal direction of the big bag should be considered in view of the big bag being suspended at the opening.

Hence, the big bag as pivoted around the suspension point with a displacement in a horizontal plane.

Horizontal and vertical is understood as common references to direction relative to the Earth and gravitational forces.

The system may perform a rotational and a horizontal alignment by operating the first and the second rotation parts in a first operation mode and subsequently in a second operation mode. E.g. in one operation mode, the rotation parts may provide a force on the sides of the big bag directed in opposite directions to each other to achieve a rotation of the inflated big bag, and in another operation mode, the rotation parts may provide a force on the sides of the big bag directed in the same direction to achieve a linear displacement of the inflated big bag in a horizontal direction.

In one embodiment of the system, the first rotation part may be configured to rotate around a first rotational axis and the second rotation part may be configured to rotate around a second rotational axis, wherein the first and second rotational axes are arranged substantially parallel to each other in a vertical direction.

One effect of this embodiment may be to achieve a more accurate control of the alignment of the inflated big bag both in regard to rotation and linear displacement of the inflated big bag.

In one embodiment of the system, the sensor arrangement may include one or more bag-abutment parts configured to be displaced in the working space and configured to be placed in contact with one side of the inflated big bag, so as to be aligned with the horizontal extension of the one side of the big bag. The sensor arrangement may be configured to provide a sensor output based on the alignment of the one or more bag-abutment parts.

The sensor arrangement may be any arrangement being able to detect an angular rotation relative to a pre-set or fixed direction and in pre-set of fixed plane.

In a further embodiment of the system, the one or more bag-abutment parts may include a bar and one or more sensing units. The bar may extend in the horizontal direction and may be configured to pivot around a vertical axis, and wherein the sensing unit is configured to detect a pivot direction of the bar.

A rotational direction of the big bag may be detected based on the pivot direction of the bar.

In one aspect of the system, the one or more bag-abutment parts and the first rotation part, the counter hold or the second rotation part are configured to be placed in contact with the same side of the inflated big bag.

In one further embodiment of the system, the sensor arrangement moreover may be configured to detect a horizontal position of the inflated big bag in the working space and may be adapted to provide an output based thereon. The controller may be configured to receive the sensor output and to control the first and second drive to displace the big bag in the horizontal direction.

The sensor arrangement may include sensing units configured to detect the exact position and rotational orientation of the inflated big bag. Alternatively, sensing units may be used for orienting angular orientation as disclosed in the above in combination with detection of the big bag in particular position e.g. by detecting the presence of the big bag in particular points or lines.

In one aspect of the system the first and/or second rotation part includes one or more of endless belts, rollers, chains.

In a further objective, a method of aligning big bags prior to product filling is disclosed. The method may include acts of:
providing a big bag having a top with an opening, a bottom and sides extending from the top to the bottom;
arranging the big bag in a working space;
suspending the big bag from a spout using holding means, such that the spout extends into the opening of the big bag;
inflating the big bag by means of gas, when suspended by the holding means;
detecting a rotational orientation of the inflated big bag in the working space by means of a sensor arrangement;
providing an output from the sensor arrangement reflecting the rotational orientation;
clamping the inflated big bag between a counter hold and a first rotation part, and
rotating the inflated big bag in the working space based on the output from the sensor arrangement by means of a first alignment arrangement including a first drive configured to operate the first rotation part in the working space.

Alternatively, a method of aligning suspended, inflated big bags is disclosed. The method may include the acts of:
detecting a rotational orientation of the suspended, inflated big bag in by means of a sensor arrangement;
providing an output from the sensor arrangement reflecting the rotational orientation of the big bag;
clamping the inflated big bag between a counter hold and a first rotation part, and
rotating the inflated big bag based on the output from the sensor arrangement by means of a first alignment arrangement including a first drive configured to operate the first rotation part.

The following effects and advantages may be achieved for both embodiments of the method. The description has taken starting point in the method defined in respect to a working space and the inflated big bag being held by a spout and holding means.

The effects and advantages achieved with the disclosed method may generally be in accordance with the effects and advantages achieved by the disclosed system. The effects and advantages will therefore not be discussed or elaboration on in the following.

The method may be implemented in any suitable existing system or in a system retrofitted hereto.

In one aspect, the method may include a further act of controlling the operation direction of the first rotation part so to control the rotational direction of the inflated big bag.

In one aspect of the disclosed methods, the counter hold may include a second alignment arrangement with a second drive and a second rotation part configured to be operated by the second drive, wherein the inflated big bag may be clamped between the first rotation part and the second rotation part. The method may include a further act of controlling the operation direction of the first rotation part and/or the operation direction of the second rotation part so to control the rotational direction of the inflated big bag.

In one aspect, the method may include a further act of controlling the operation direction of the second rotation part so to displace the big bag in a horizontal direction.

In one aspect of the method, the means are provided by means of the system disclosed herein.

In a further objective, a computer program is disclosed. The computer program may include instructions to cause the disclosed system to execute the steps of the disclosed methods.

In a further objective, a computer program is disclosed. The computer program may include instructions to execute one or more of the steps of the disclosed methods.

In a further objective, a computer-readable medium is disclosed. The computer-readable medium may have stored thereon the above disclosed computer program.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Figure 1A:
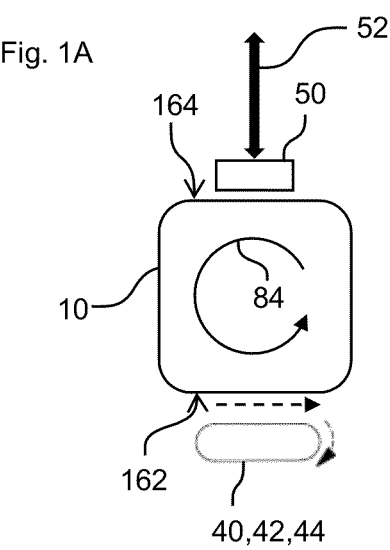
FIGS. 1A-1D illustrate embodiments of the system for rotational alignment of an inflated big bag in accordance with the present invention.

| Detailed description of the disclosure | |
|---|---|
| No | Item |
| 1 | system |
| 2 | spout |
| 4 | holding means |
| 10 | big bag |
| 12 | top |
| 14 | bottom |
| 16 | sides |
| 162 | first side |
| 164 | second side |
| 18 | opening |
| 20 | frame |
| 30 | working space |
| 40 | first alignment arrangement |

-continued

Detailed description of the disclosure

| No | Item |
|---|---|
| 42 | first drive |
| 44 | first rotation part |
| 50 | counter hold |
| 52 | displacement arrangement |
| 60 | second alignment arrangement |
| 62 | second drive |
| 64 | second rotation part |
| 70 | sensor arrangement |
| 72 | controller |
| 74 | sensor output |
| 174 | sensor output |
| 274 | sensor output |
| 76 | bag-abutment parts |
| 80 | rotational orientation |
| 82 | operation direction |
| 84 | rotational direction |
| 86 | pivot direction |
| 88 | horizontal position |
| 89 | horizontal direction |
| 90 | bar |
| 92 | sensing units |
| 100 | method |
| 102 | providing |
| 104 | arranging |
| 106 | suspending |
| 108 | inflating |
| 110 | detecting |
| 112 | clamping |
| 114 | rotating |
| 116 | controlling |

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, when a layer, area, element, or plate is referred to as being "on" another layer, area, element, or plate, it may be directly on the other layer, area, element, or plate, or intervening layers, areas, elements, or plates may be present there between. Conversely, when a layer, area, element, or plate is referred to as being "directly on" another layer, area, element, or plate, there are no intervening layers, areas, elements, or plates there between. Further when a layer, area, element, or plate is referred to as being "below" another layer, area, element, or plate, it may be directly below the other layer, area, element, or plate, or intervening layers, areas, elements, or plates may be present there between. Conversely, when a layer, area, element, or plate is referred to as being "directly below" another layer, area, element, or plate, there are no intervening layers, areas, elements, or plates there between.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the FIG. is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed there between.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

FIGS. 1A-1D illustrate four embodiments of the system for rotational alignment of an inflated big bag 10. Only parts of the systems interacting with the big bag for achieving the rotation of the big bag are illustrated. The systems are illustrated as seen from the top 12 or the bottom 16 of the big bag 10.

FIG. 1A illustrates one embodiment, wherein the system includes a first alignment arrangement 40 and a counter hold 50. The first alignment arrangement 40 includes a first drive 42 and a first rotation part 44. The first drive 42 is configured to operate the first rotation part 44.

The counter hold 50 is illustrated as providing an elongated face in contact with the big bag. The counter hold should include a surface providing a frictional force between the big bag and the counter hold sufficient to maintain the contact during rotation of the big bag caused by the first rotation part. Hence, the shape, material and roughness of the surface should be chosen accordingly.

The displacement of the counter hold 50, the first alignment arrangement 40 or both during use of the system may be performed before inflating the big bag, after inflating or during.

After displacement of the counter hold 50 or the first alignment arrangement 40, and inflation of the big bag, the counter hold 50 and the first alignment arrangement 40 are arranged, such that they inflict an inwards clamping force onto the sides of the big bag; they clamp the big bag at opposing sides 162, 164.

By operating the first rotation part 44 in an operation direction 82 to apply a linear force in a perpendicular direction to the clamping force, a rotation of the big bag can be achieved. The achieved rotation direction 84 depends on the direction of the clamping force and on the applied linear force and will substantially be in the plane spanned by the directions of the applied forces. In FIG. 1A a counter clockwise rotation of the big bag 10 is achieved by applying a force on the big bag's first side 162 in the right hand direction. The first rotation part 44 is illustrated as an endless band being operated by the first drive 42.

The counter hold 50 is illustrated as providing an elongated face in contact with the big bag. The counter hold should comprise a surface providing a frictional force between the big bag and the counter hold sufficient to maintain the contact during rotation of the big bag caused by the first rotation part. Hence, the shape, material and roughness of the surface should be chosen accordingly.

Figure 1B:
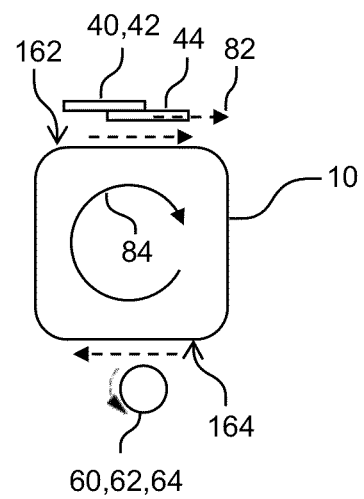

FIG. 1B illustrates another embodiment of the system, wherein the counter hold includes a second alignment arrangement 60 including a second rotation part 64 and a second drive 62. The second drive is configured to operate the second rotation part 64 for rotation of the inflated big bag 10.

In this embodiment, the first alignment arrangement 40 includes a first rotation part 44 being displaced linear to apply a linear force to the big bag perpendicular to the inwards clamping force. The second alignment arrangement 60 includes a roller or an endless band as the second rotation part 64. The first rotation part 44 and the second rotation part 64 are operated to apply forces in opposite directions on opposite sides 162, 164 of the big bag, such that both forces act together on the big bag to achieve a rotation. Here a rotation with a clockwise rotation direction 84 is achieved.

Figure 1C:
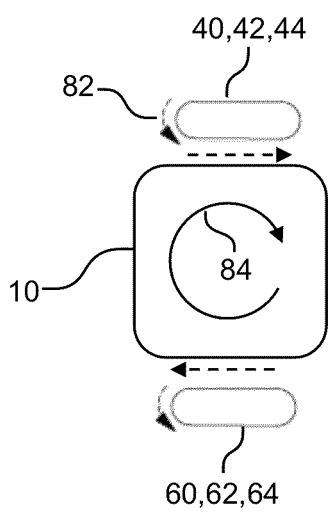
Figure 1D:
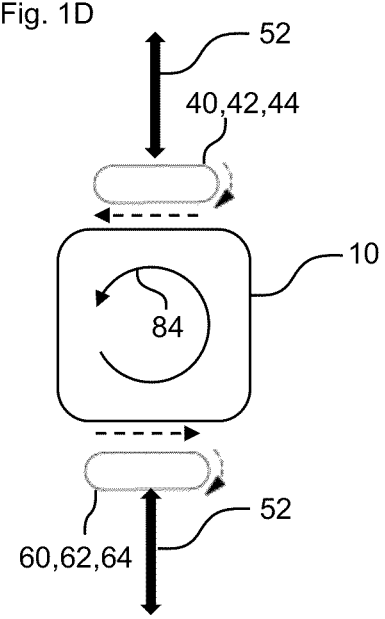

FIGS. 1C and 1D illustrates alternative embodiment of the embodiment of FIG. 1B with the first rotation part 44 and the second rotation part 64 being endless bands, and applying linear forces to the big bag acting together to achieve a clockwise rotation of the big bag in FIG. 1C and a counter clockwise rotation of the big bag in FIG. 1D. In FIG. 1D is illustrated a displacement of both the first and the second alignment arrangement 40, 60.

FIG. 2 illustrates three embodiments of the system for a linear alignment of an inflated big bag. The big bag is aligned in a linear direction, such that the big bag or rather part of the big bag is displaced in a horizontal direction 89. Hence, the big bag is pivoted around its suspension point to displace the bottom of the big bag in a horizontal direction to position the big bag according to a support e.g. a pallet.

Figure 2A:
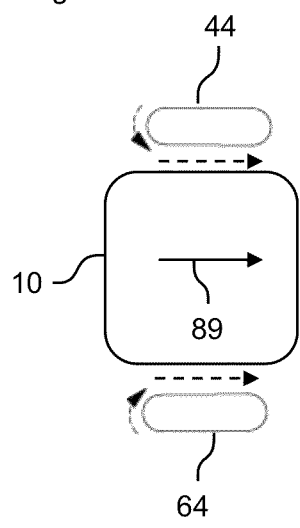
FIGS. 2A-2C illustrate embodiments of the system for a linear alignment of an inflated big bag in accordance with the present invention.
Figure 2B:
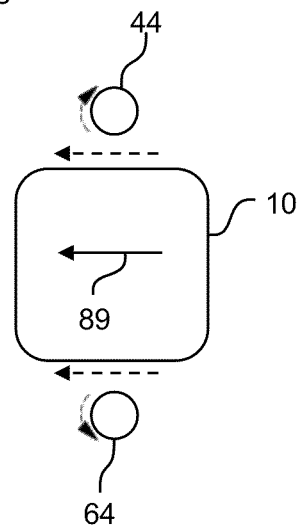
Figure 2C:
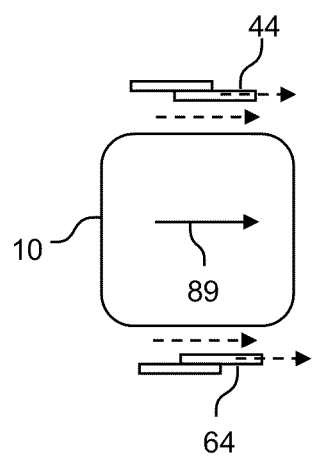

The embodiments illustrated in FIGS. 2A-2C are similar to those of FIGS. 1B, 1C and 1D including first and second alignment arrangements 40, 60, first and second drives 42, 62 and first and second rotation parts. Thus, only the parts of the systems interacting with the big bag for achieving the horizontal or linear displacement of the big bag are illustrated, and the operation of these when operated differently from the embodiments in FIG. 1 are discussed.

FIG. 2A illustrates one embodiment where the first and second rotation parts 44, 64 are endless bands operation together to apply linear forces to the opposite sides 162, 164 of the big bag. The forces are applied such that substantially same force value and same force direction are applied to the two sides, such that a linear displacement of the big bag in direction of the applied forces is achieved.

FIG. 2B illustrates an embodiment where the first rotation part 44 and second rotation parts 64 are rollers, which may be considered endless bands.

In FIGS. 2A and 2B the applied linear forces are applied by a rotational movement of the first and second rotation parts 44, 64.

FIG. 2C illustrates an embodiment where the first and second rotation parts 44, 64 are displaced linear to apply the linear force to the big bag for achieving the linear displacement of the big bag. The rotation parts 44, 64 may comprise substantially planar surfaces to come in contact with the big bag. The surfaces may as previously discussed be adapted to achieve a frictional force between the surface and the big bag to obtain a displacement of the big bag.

FIG. 2C illustrates an embodiment where the first and second rotation parts 44, 64 are displaced linear to apply the linear force to the big bag for achieving the linear displacement of the big bag. The rotation parts 44, 64 may include-substantially planar surfaces to come in contact with the big bag. The surfaces may as previously discussed be adapted to achieve a frictional force between the surface and the big bag to obtain a displacement of the big bag.

Figure 3A:
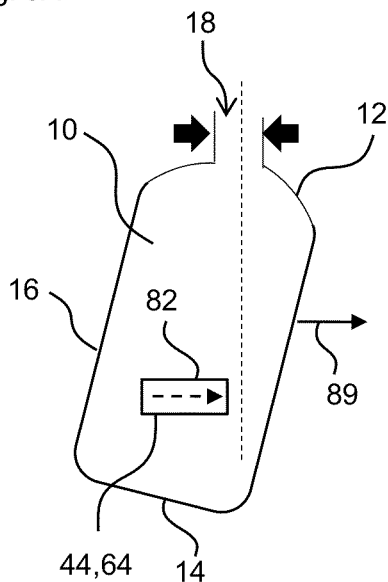
FIGS. 3A-3F illustrate one embodiment of the system for linear and rotational alignment of an inflated big bag in accordance with the present invention.
Figure 3B:
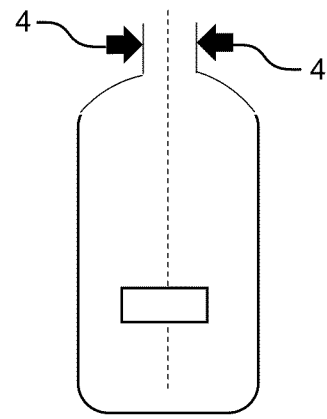

FIGS. 3A-3F illustrate one embodiment of the system for linear and rotational alignment of an inflated big bag 10. FIGS. 3A and 3B illustrates the big bag seen from a side view held by holder 4 and suspended at the opening 18. The big bag includes a top 12, a bottom 14 and sides 16. The big bag is illustrated as being clamped by a first and a second alignment arrangement 40, 60 both applying a linear force to opposing sides of the big bag but in the same direction being the direction of intended displacement of the big bag. Only one of the first or second alignment arrangements are visible in the side view.

Figure 3C:
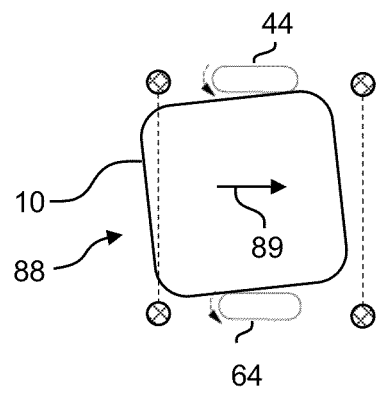
Figure 3D:
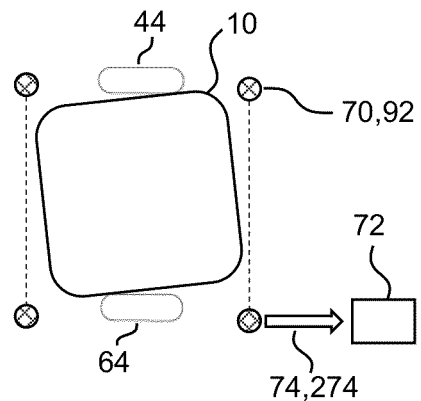

FIGS. 3C and 3D illustrates the big bag of FIGS. 3A and 3B respectively as seen from the bottom.

FIGS. 3C and 3D furthermore illustrates parts of one embodiment of the system including the sensor arrangement 70 configured to detect a horizontal position 88 of the inflated big bag 10 in the working space. In the illustrated embodiment, the sensor arrangement 70 includes four sensing units 92 arranged in pairs. The sensing units outlines two straight lines marking the boundaries between which the big bag should be arranged after alignment. Other embodiments of the sensor arrangement may be envisioned with a mix of active and passive sensing units, the sensing units arranged horizontally aligned or in a tilted angel. A single pair or a set of sensing units may be envisioned. Alternatively, multiple pairs or sets of sensing units may be envisioned.

One or more of the sensing units 92 are configured to provide an output 74, 274 to a controller 72 included in the system. The controller 72 is configured to receive the sensor output 74, 274 and to control the first and the second drive 42, 62 to operate the first and the second rotation part 44, 64, such that the big bag is displaced in the horizontal direction 89.

Figure 3E:
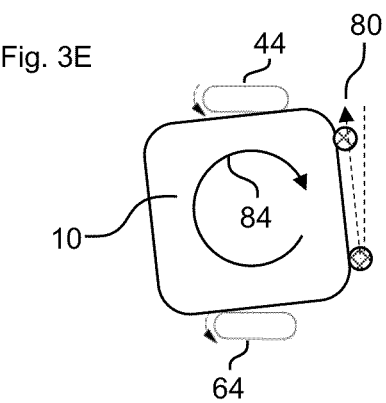
Figure 3F:
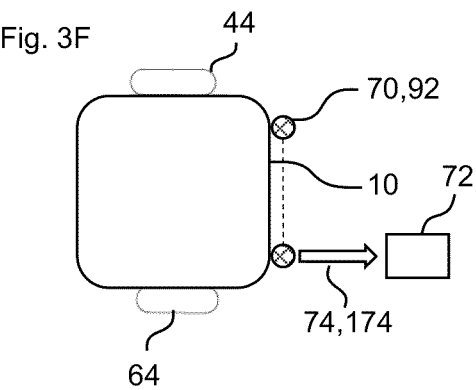

FIGS. 3E and 3F illustrate the big bag seen from a top or bottom view with the big bag still being clamped by the first and the second rotational parts arrangement 44, 64 both applying a linear force to opposing sides of the big bag but now in opposite direction to achieve a rotation of the big bag with an rotational direction 84 in accordance herewith.

Hence, the same two alignment arrangements are used but operated differently with respect to operation direction 82 of the rotational parts 44, 64 to achieve respectively the horizontal displacement (linear displacement) and the rotation of the inflated big bag.

FIGS. 3E and 3F furthermore illustrate parts of one embodiment of the system including the sensor arrangement 70 configured to detect the rotational orientation 80 of the inflated big bag. In the illustrated embodiment, the sensor arrangement 70 includes two sensing units 92 arranged in a pair outlining a rotational orientation 80 according to a fixed orientation, both orientations marked by the dashed lines in FIG. 3E. The fixed orientation marking the intended rotational orientation of the big bag after alignment. Other embodiments of the sensor arrangement may be envisioned with a mix of active and passive sensing units, the sensing units arranged horizontally aligned or in a tilted angel. A single pair, a single set or simply a single sensing unit(s) may be envisioned. Alternatively, multiple pairs or sets of sensing units may be envisioned.

One or more of the sensing units 92 are configured to provide an output 74, 174 to a controller 72 included in the system. The controller 72 is configured to receive the sensor output 74, 174 and to control the first and/or the second drive 42, 62 to operate the first and/or the second rotation part 44, 64 respectively, such that the big bag is rotated into the intended rotational orientation 80.

Figure 4A:
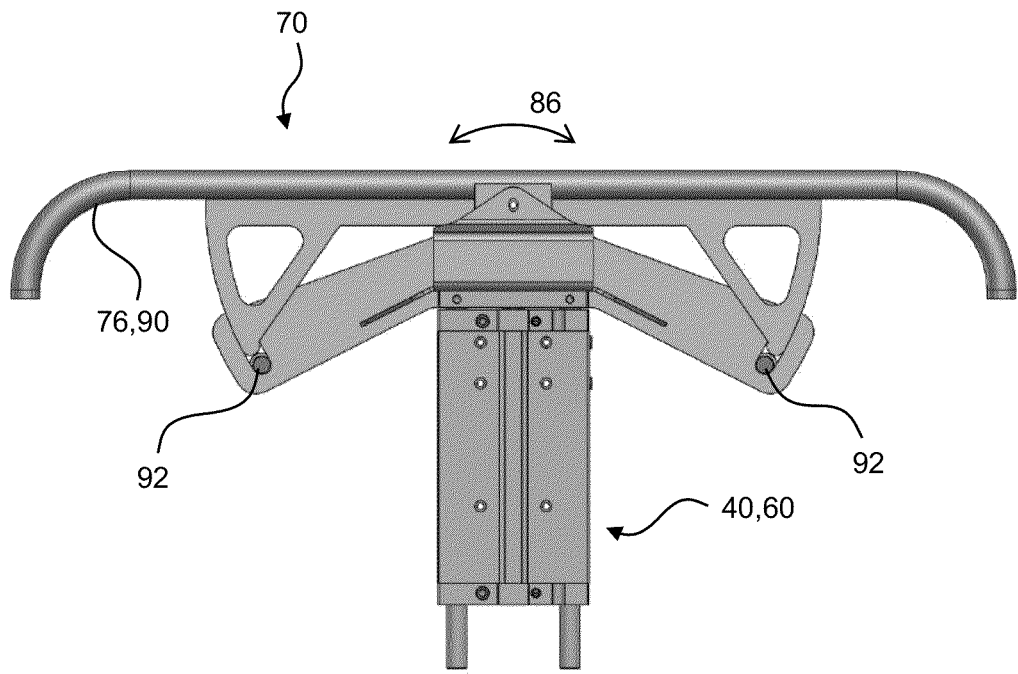
FIGS. 4A-4B illustrate one embodiment of a sensor arrangement for detecting a rotational orientation of an inflated big bag in accordance with the present invention.
Figure 4B:
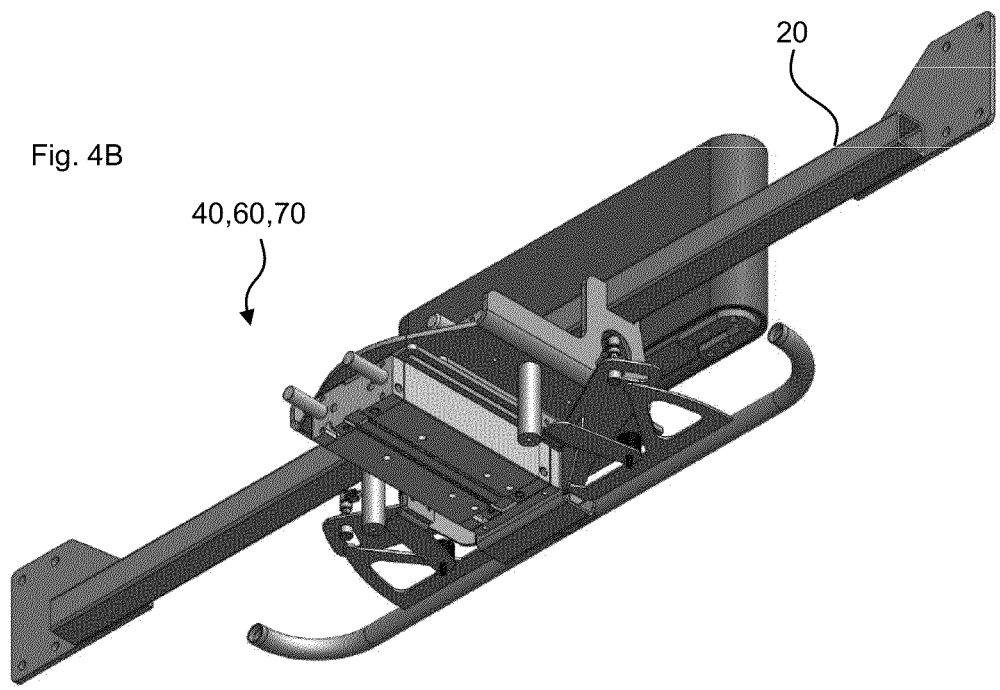

FIGS. 4A-4B illustrate one embodiment of a sensor arrangement 70 for detecting a rotational orientation of an inflated big bag. The sensor arrangement 70 includes in this embodiment a bar 90 being the bag-abutment part 76. The bag-abutment part is placed in contact with one side of the inflated big bag and is pivotable in a pivot direction 86 around a pivot point. The bar 90 in this embodiment is suspended by a pivot point and can be aligned with the horizontal extension of the one side of the big bag, when arranged in contact herewith with sufficient force to pivot the bar 90.

The sensor arrangement 70 includes two sensing units 92 arranged in a fixed part and two cover units are integrated in the bar to fully or partly cover one of the sensing units, when the bar 90 is pivoted. The sensing units in combination with the cover units are on example of detecting a rotational oriental of the big bag. Other solutions may be applied, e.g., sensing units 92 with a cover part with holes in arranged to cover both sensing units when the bar is pivoted, a goniometer, distance measurements, a spring suspended bar or spring suspended elements arranged displace along the horizontal extension of the one side of the big bag or similar arrangements obtaining a detection of a rotational orientation 80 of the inflated big bag.

The sensor arrangement 70 of the embodiment illustrated in FIG. 4A is illustrated as being integrated with the first alignment arrangement 40. Alternatively the second alignment arrangement 60.

FIG. 4B illustrates the sensor arrangement 70 of FIG. 4A arranged on a frame bar, which may be part of the system frame 20. The first rotation part 44 and the sensor arrangement 70 are both arranged on the first alignment arrangement 40, such that the first rotation part 44 and the abutment part 76, here the bar 90 are arranged to be placed in contact with the same side 16 of the inflated big bag. Alternatively, the second rotation part 64 or the counter hold could be arranged integrated with the sensor arrangement 70, such that they were to be placed in contact with the same side of the big bag.

Figure 5:
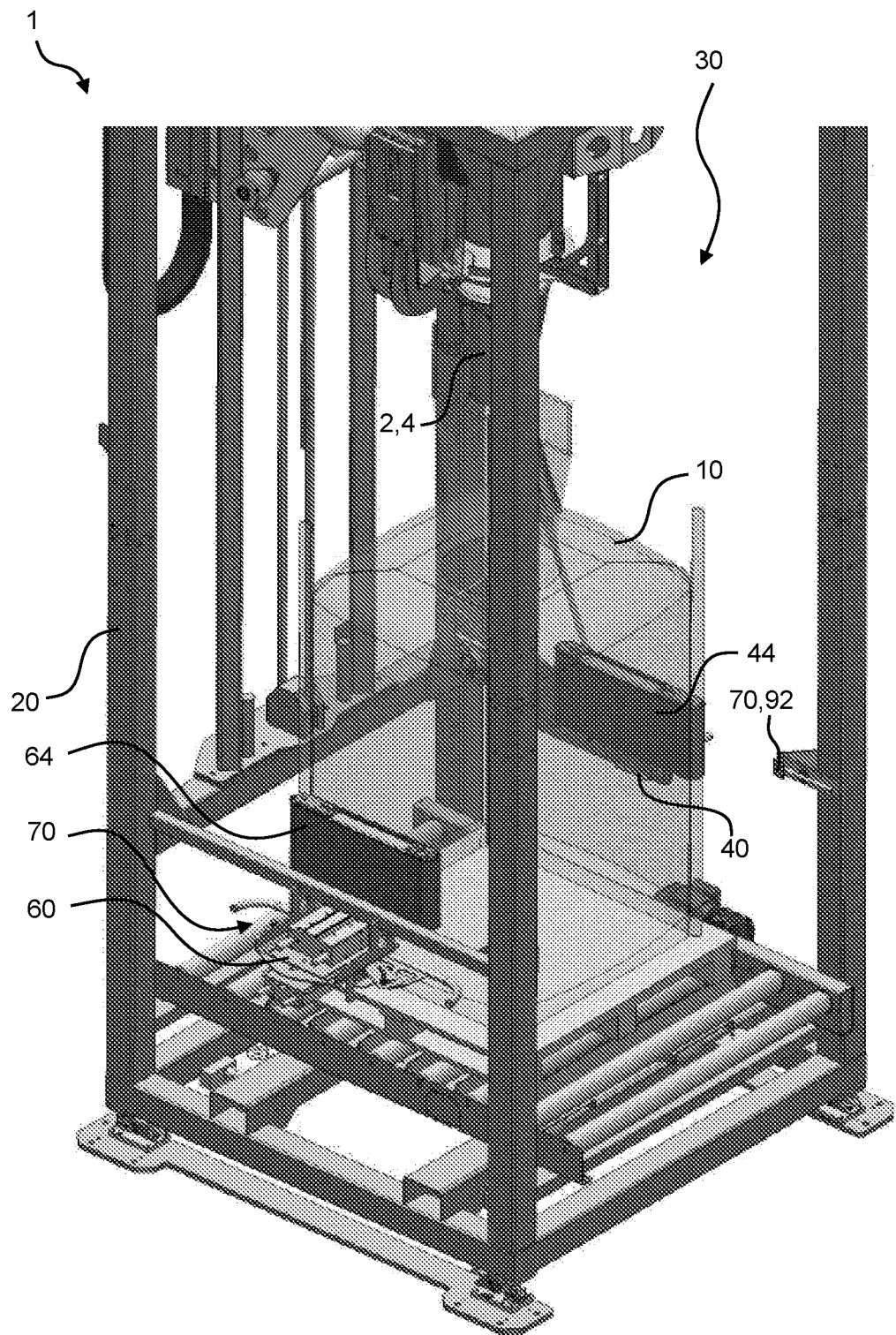
FIG. 5 illustrates one embodiment of a system for alignment of big bags prior to filling in accordance with the present invention.

FIG. 5 illustrates one embodiment of the system 1 for alignment of big bags prior to product filling. The system 1 includes a frame 20 defining a working space 30. The working space is configured for receiving a big bag 10.

The system furthermore includes a spout 2 and a holder 4 for holding the big bag 10 at the opening 18, such that the spout 2 extends into the opening of the big bag.

The system inflates the big bag by filling the big bag with a gas through the opening. After inflation, the big bag can be properly aligned with a support, e.g., a pallet before filling the big bag with the end product. For inflating the big bag with gas and aligning the big bag, the big bag is suspended by the holder.

In the illustrated embodiment, the system 1 includes a first alignment arrangement 40 including a first drive and a first rotation part 44 and a second alignment arrangement 60 including a second drive and a second rotation part 64.

The two alignment arrangements are arranged to be operated on opposing sides of the big bag within the working space 30.

The system includes a sensor arrangement 70 for detecting a rotational orientation 80 of the big bag and for detecting a horizontal position 88 of the inflated bag. The rotational orientation is detected by use of a bar 90 and sensing units 92 as illustrated in FIG. 4. The horizontal position 88 is detected by use of additional sensing units 92 here arranged on the frame 20. The sensing units are arranged to detect if the big bag is within a set boundary similar to that illustrated in FIGS. 3C and 3D.

Figure 6:
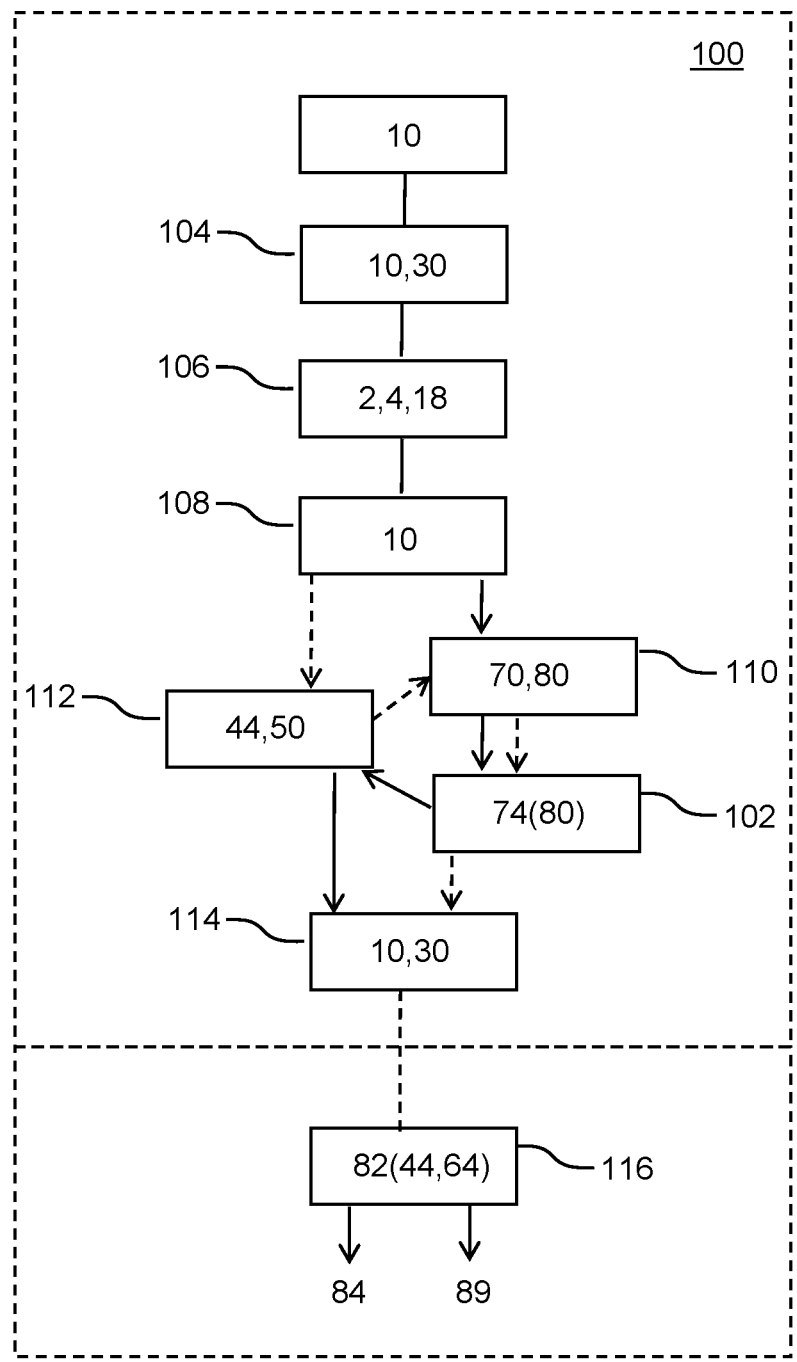
FIG. 6 illustrates one embodiment of a method of aligning big bags prior to filling in accordance with the present invention.

FIG. 6 illustrates four embodiments of the method 100 of aligning big bags prior to product filling. One embodiment is illustrated by the top dashed box and three further embodiments are illustrated by adding the additional act(s) illustrated by the bottom dashed box. The method 100 illustrated in the top dashed box includes the acts of:

providing 102 a big bag 10 having a top with an opening 18, a bottom and sides extending from the top to the bottom;

arranging 104 the big bag in a working space 30;

suspending 106 the big bag from a spout 2 using a holder 4, such that the spout 2 extends into the opening of the big bag;

inflating 108 the big bag 10 by means of gas when suspended by the holding means;

detecting 110 a rotational orientation 80 of the inflated big bag in the working space by means of a sensor arrangement 70;

providing 102 an output 74 from the sensor arrangement reflecting the rotational orientation;

clamping 112 the inflated big bag between a counter hold 50 and a first rotation part 44, and rotating 114 the inflated big bag 10 in the working space based on the output 74 from the sensor arrangement 70 by means of a first alignment arrangement 40 including a first drive 42 configured to operate the first rotation part 44 in the working space.

The method may be performed with one or more of the acts performed simultaneous or in any expedient order. This is illustrated for the acts of detecting 110 the rotational orientation 80 of the inflated big bag, providing 102 an output 74 from the sensor arrangement and clamping 112 the inflated big bag between the counter hold 50 and the first rotation part 44. Here one time order for performing the acts are illustrated by the dashed-line arrows and another time order illustrated by the solid-line arrows.

The three additional embodiments of the method 100 includes in one embodiment the further act of controlling 116 the operation direction 82 of the first rotation part 44 so to control the rotational direction 84 of the inflated big bag.

The other two embodiments include that the counter hold 50 includes a second alignment arrangement 60 with a second drive 62 and a second rotation part 64 configured to be operated by the second drive where the inflated big bag is clamped between the first rotation part 44 and the second rotation part 64.

In one embodiment, the method 100 includes the further act of controlling 116 the operation direction 82 of the first rotation part 44 and/or the operation direction 82 of the second rotation part 64 so to control the rotational direction (84) of the inflated big bag.

In another embodiment, the method 100 includes the further act of controlling 116 the operation direction 82 of the first and the second rotation part 44, 64 so to displace the big bag in a horizontal direction 89.

The invention claimed is:

1. A system for alignment of big bags prior to product filling, the system comprising:
   a frame defining a working space configured for receiving a big bag comprising:
   a top with an opening;
   a bottom; and
   sides extending from the top to the bottom, wherein the bag is configured for holding a volume in the range of 500 L to 3000 L and/or having a height when inflated from the bottom to the top in the range of 0.5 m to 2.5 m;
   a spout; and
   a holder configured for holding the big bag at the opening (18) of the big bag, such that the spout extends into the opening of the big bag, wherein the system is adapted for filling gas into the big bag through the opening to inflate the big bag when suspended by the holder;
   an alignment arrangement configured to rotate the big bag when inflated and comprising a drive configured to operate a rotation part in a working space;
   a counter hold;
   a displacement arrangement for displacing the alignment arrangement and/or the counter hold in the working space to bring the rotation part into contact with a first side of the big bag when inflated and the counter hold into contact with a second side of the big bag when inflated opposing the first side of the big bag when inflated;
   a sensor arrangement configured to detect a rotational orientation of the big bag when inflated in the working space and adapted to provide a sensor output based thereon; and
   a controller configured to receive the sensor output and control the drive to rotate the big bag when inflated based on the sensor output by the rotation part.

2. The system according to claim 1, wherein the counter hold comprises a second alignment arrangement comprising a second rotation part and a second drive configured to operate the second rotation part in the working space, wherein the controller is configured to furthermore control the second drive to rotate the big bag when inflated by the second rotation part.

3. The system according to claim 2, wherein the controller is configured to control an operation direction of the rotation part and an operation direction of the second rotation part, so to control a rotational direction of the inflated big bag when inflated.

4. The system according to claim 2, wherein the controller is configured to control an operation direction of the rotation part and an operation direction of the second rotation part, so to displace the big bag in a horizontal direction.

5. The system according to claim 2, wherein the sensor arrangement is configured to detect a horizontal position of the big bag when inflated in the working space and is adapted to provide an output based thereon, and wherein the controller is configured to receive the sensor output and to control the drive and/or the second drive to displace the big bag in the horizontal direction.

6. The system according to claim 1, wherein the rotation part is configured to rotate around a first rotational axis and the second rotation part is configured to rotate around a second rotational axis wherein the first rotational axis and the second rotational axis are arranged substantially parallel to each other in a vertical direction.

7. The system according to claim 1, wherein the sensor arrangement comprises one or more bag-abutment parts configured to be displaced in the working space and placed in contact with one side of the big bag when inflated, so as to be aligned with a horizontal extension of the one side of the big bag, wherein the sensor arrangement is configured to provide a second sensor output based on alignment of the one or more bag-abutment parts.

8. The system according to claim 7, wherein the one or more bag-abutment parts comprise a bar and one or more sensing units, wherein the bar extends in a horizontal direction and is configured to pivot around a vertical axis, and wherein the one or more sensing units of the one or more bag-abutment parts are configured to detect a pivot direction of the bar.

9. A method of aligning big bags prior to product filling comprising:
providing a big bag comprising:
a top with an opening;
a bottom; and
sides extending from the top to the bottom, wherein the big bag is configured for holding a volume in the range of 500 L to 3000 L and/or having a height when inflated from the bottom to the top in the range of 0.5 m to 2.5 m;
arranging the big bag in a working space;
suspending the big bag from a spout using a holder, such that the spout extends into the opening of the big bag;
inflating the big bag by gas when suspended by the holder;
detecting a rotational orientation of the big bag when inflated in the working space by a sensor arrangement;
providing an output from the sensor arrangement reflecting the rotational orientation;
clamping the big bag when inflated between a counter hold and a rotation part; and
rotating the big bag when inflated in the working space based on the output from the sensor arrangement by an alignment arrangement comprising a drive configured to operate the rotation part in the working space.

10. The method according to claim 9, wherein the counter hold comprises a second alignment arrangement with a second drive and a second rotation part configured to be operated by the second drive, and the big bag when inflated is clamped between the first rotation part and the second rotation part, the method further comprising controlling an operation direction of the rotation part and/or an operation direction of the second rotation part so to control a rotational direction of the big bag when inflated and/or to displace the big bag in a horizontal direction.

* * * * *